United States Patent [19]
Peng et al.

[11] 3,880,360
[45] Apr. 29, 1975

[54] METHOD OF PREPARING HOMOGENEOUS THERMOSETTING POWDER PAINT COMPOSITION

[75] Inventors: Stephen C. Peng, Utica; Denis E. Wilemski, Warren, both of Mich.

[73] Assignee: Ford Motor Company, Dearborn, Mich.

[22] Filed: Dec. 5, 1973

[21] Appl. No.: 422,060

[52] U.S. Cl. .......................... 241/3; 241/23; 241/24
[51] Int. Cl. ............................................ B02c 19/12
[58] Field of Search ...................... 241/3, 23, 24, 25; 425/203, 208

[56] References Cited
UNITED STATES PATENTS

| | | | |
|---|---|---|---|
| 3,114,930 | 12/1963 | Oldham et al. | 241/3 X |
| 3,481,001 | 12/1969 | Stillhard | 425/203 X |
| 3,595,533 | 7/1971 | Sutter | 425/203 X |
| 3,633,494 | 1/1972 | Schippers | 425/208 |
| 3,643,874 | 2/1972 | Franz | 241/3 |
| 3,738,409 | 6/1973 | Skidmore | 425/203 |
| 3,797,550 | 3/1974 | Latinen | 425/203 X |

Primary Examiner—Granville Y. Custer, Jr.
Attorney, Agent, or Firm—Roger L. May; Keith L. Zerschling

[57] ABSTRACT

A method of preparing a homogeneous thermosetting powder paint composition which cures to form a coating exhibiting outstanding exterior durability, adhesion, impact strength and color match. The method comprises: introducing a liquid composition including at least a crosslinkable copolymer and an inert solvent into an evaporating zone adapted to evaporate the inert solvent; passing the liquid composition into a separating zone wherein the inert solvent vapor is removed and the non-volatile components of the composition are mechanically forced therefrom in a molten state; cooling said non-volatile components; and pulverizing to form a powder. More particularly, the separating zone comprises a conical chamber containing a tapered screw which drives the molten non-volatile components under pressure from the chamber.

24 Claims, 3 Drawing Figures

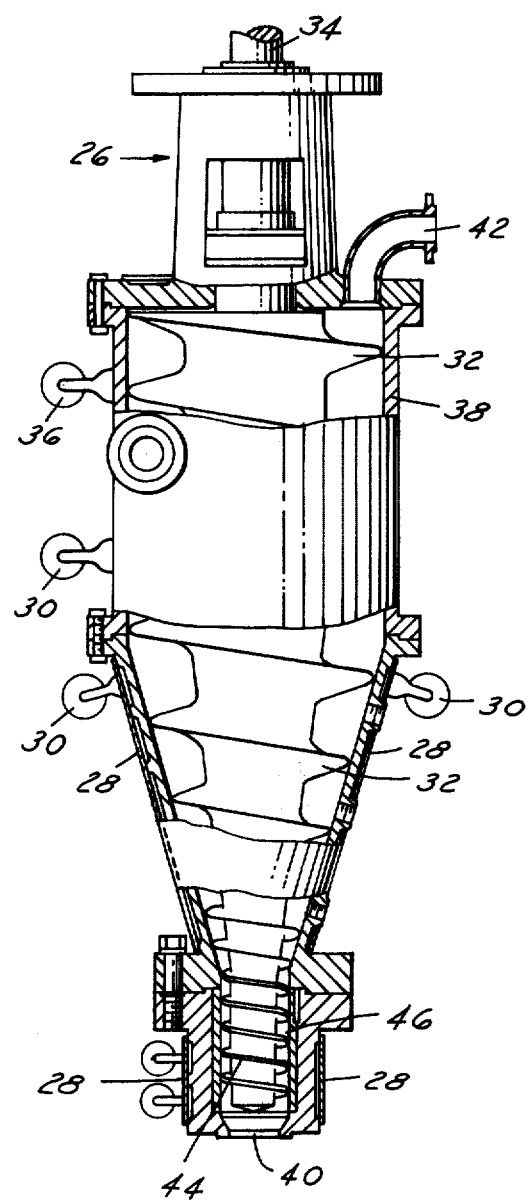

METHOD OF PREPARING HOMOGENEOUS THERMOSETTING POWDER PAINT COMPOSITION

This application relates to a process of preparing powder paint compositions useful for providing protective and decorative surface coatings on a variety of substrates including glass, metal and other substrates which can withstand the curing temperature of the powder. More particularly, this application is directed to a method of preparing homogeneous thermosetting powder paint compositions which cure to form coatings exhibiting outstanding exterior durability, adhesion, impact strength and color match.

BACKGROUND OF THE INVENTION

Powder coating compositions have become increasingly desirable in recent years for various reasons including those relating to ecology, health and safety. More particularly, powder coating compositions are preferable to liquid paints containing volatile solvents which must be volatilized after application, thus resulting in solvents escaping into the atmosphere and creating health and safety hazards as well as undesirable pollution problems. Powder coating compositions, on the other hand, are curable by heat in a manner such that little, if any, volatile material is given off to the environment.

While powder paint compositions have been proposed, coatings formed from such compositions share various problems, most of whict at least in part result from the processes by which they are prepared. Prior art manufacturing methods include ball milling, Z-blade mixing and extrusion, all of which suffer from certain deficiencies.

Ball milling is the simplest of these three methods. In the manufacture of epoxy based powder coatings, for example, all ingredients such as granulated epoxy resin, hardener or curing agent, pigments and other additives are loaded into a ceramic lined ball mill. Ceramic grinding media of varied sizes and shapes are generally used to grind the materials for 10 to 15 hours to produce a blend. While other types of ball milling can be used to produce a similar blend in a shorter time, this method is very time consuming and is not adaptable to a continuous process. Also, such a method does not achieve good dispersion of pigments and other additives such as crosslinking agents. Thus, the powders formed in such a manner cure to form coatings of exceptionally low gloss and opacity. Still further, such a process does not allow satisfactory color and shade matching.

In Z-blade mixing, resin is first heated in a Z-blade mixer to at least its melting point and when molten all other ingredients except curing agent are added slowly. In general, dispersion requires about 6 hours after which the temperature of the Z-blade mixer is reduced and curing agent added. As soon as the curing agent has been adequately mixed, the melt is cooled, pulverized and classified. The compositions formed by this process generally produce coatings having inadequate pigment dispersion and gloss requirements for top coat uses such as for automobiles. As was the case with ball milling it is also difficult to obtain adequate color and shade matching with this process. Also, since the process is a batch process, the mill has to be thoroughly cleaned after each run because of the build-up of heat sensitive material.

In the extrusion method, the resin being used is blended with all other ingredients and fed into a heated extruder where high shearing forces are applied to effect mixing of the viscous molten components. Although the powders produced by this method are generally of higher quality than those formed from powders made by processes including ball milling or Z-blade mixing steps, the process still suffers from several serious disadvantages. First, the high shear forces required to effect mixing may cause a loss of color match in the final powder. Second, in such a process the thoroughness of mixing as well as the speed with which an adequately mixed extrudate may be produced will depend on the amount of shear force applied to the material which in turn is a function of the speed at which the extruder screw turns. Thus, in order to achieve rapid, thorough mixing of the viscous resin and molten crosslinking agent the extrusion process has high power requirements and is, therefore, expensive. Third, the process is also expensive because of the relatively high cost of the extrusion equipment. Finally, because of the inherent output limitations on any given extruder, the process is not readily adaptable to varied processing speeds. Thus, the input into the extruder in such a process must be metered to the capacity of the extruder.

The processes disclosed in application Ser. No. 389,845 entitled "Method of Preparing Powder Paint Compositions-I" and Ser. No. 389,844 entitled "Method of Preparing Powder Paint Compositions-II," both filed Aug. 20, 1973, overcome many of the problems associated with these prior art processes by accomplishing more complete and uniform dispersion of paint additives. Both processes comprise introducing liquid compositions containing at least a crosslinkable copolymer and uniformly dispersed pigment into an evaporating zone adapted to evaporate the inert solvents contained therein; passing the liquid into a separating zone; causing the solvent vapor to be removed; removing the non-volatile components of the paint in a molten state by gravity; cooling the nonvolatile components; and pulverizing to form a powder. The former application covers processes wherein, if desired, either a self-crosslinking copolymer or a crosslinkable copolymer and a crosslinking agent therefor are included in the liquid paint composition and processed directly through evaporating and separating zones prior to cooling and pulverizing. Such a process has obvious advantages in that all additives including crosslinking agents if employed are uniformly dispersed in the molten resin. However, such a process has the disadvantage that while the molten material is being withdrawn from the separating zone, premature gelling or crosslinking may occur. The process of the latter application avoids this problem by processing liquid compositions which contain crosslinkable copolymers but not crosslinking agents and then mixing the powder and crosslinking agent at a temperature greater than the melting point of both components, cooling the resultant molten homogeneous mass to form a solid and then pulverizing to form the final powder. While this process eliminates premature crosslinking the equipment involved is expensive and the process is inefficient because of the number of steps involved.

Accordingly, it is an object of this invention to provide a process of forming powders wherein complete and uniform dispersion of all paint additives, including crosslinking agents, if desired, is effected efficiently and at a minimum of expense without resulting in composition degradation or premature crosslinking.

BRIEF DESCRIPTION OF THE INVENTION

The above object is accomplished in accordance with the invention by a process which comprises:

A. introducing a liquid composition comprising a solution of inert solvent and a copolymer containing crosslinkable functional groups, said copolymer having a glass transition temperature in the range of 40°C to 90°C and a number average molecular weight between about 1,000 and about 15,000, into an evaporating zone adapted to evaporate the inert solvent;

B. heating the solution while within the evaporating zone and maintaining the temperature in the evaporating zone at a level
   1. above the melting point of the copolymer but below the point at which degradation or gelling of the copolymer occurs;
   2. above the temperature at which inert solvent begins to vaporize;

C. passing said solution from said evaporating zone into a separating zone and, while maintaining the temperature within said separating zone above the melting point of the copolymer,
   1. causing solvent vapor to be removed and
   2. mechanically driving molten nonvolatile components of the liquid from the separating zone;

D. cooling the nonvolatile components to solid form; and

E. pulverizing said solid material to form a uniformly pigmented powder.

Generally, it is desirable to also include additives such as pigments, flow control agents, antistatic agents, catalysts, plasticizers, and crosslinking agents, etc. in the liquid composition being processed. However, it may be desirable to blend the crosslinking agent with the material after devolatilizing or after the powder is formed if there is any danger of premature gelling or crosslinking due to the extreme conditions of the evaporating and separating zones. Of course, no crosslinking agent is required when the copolymer employed is self-crosslinking.

Further objects and attendant advantages will become more apparent from the following detailed description when read in conjunction with the accompanying drawings in which:

FIG. 3 shows an enlarged partial cross-sectional view of the separating means of FIG. 1.

DETAILED DESCRIPTION OF THE INVENTION

Figure 1:
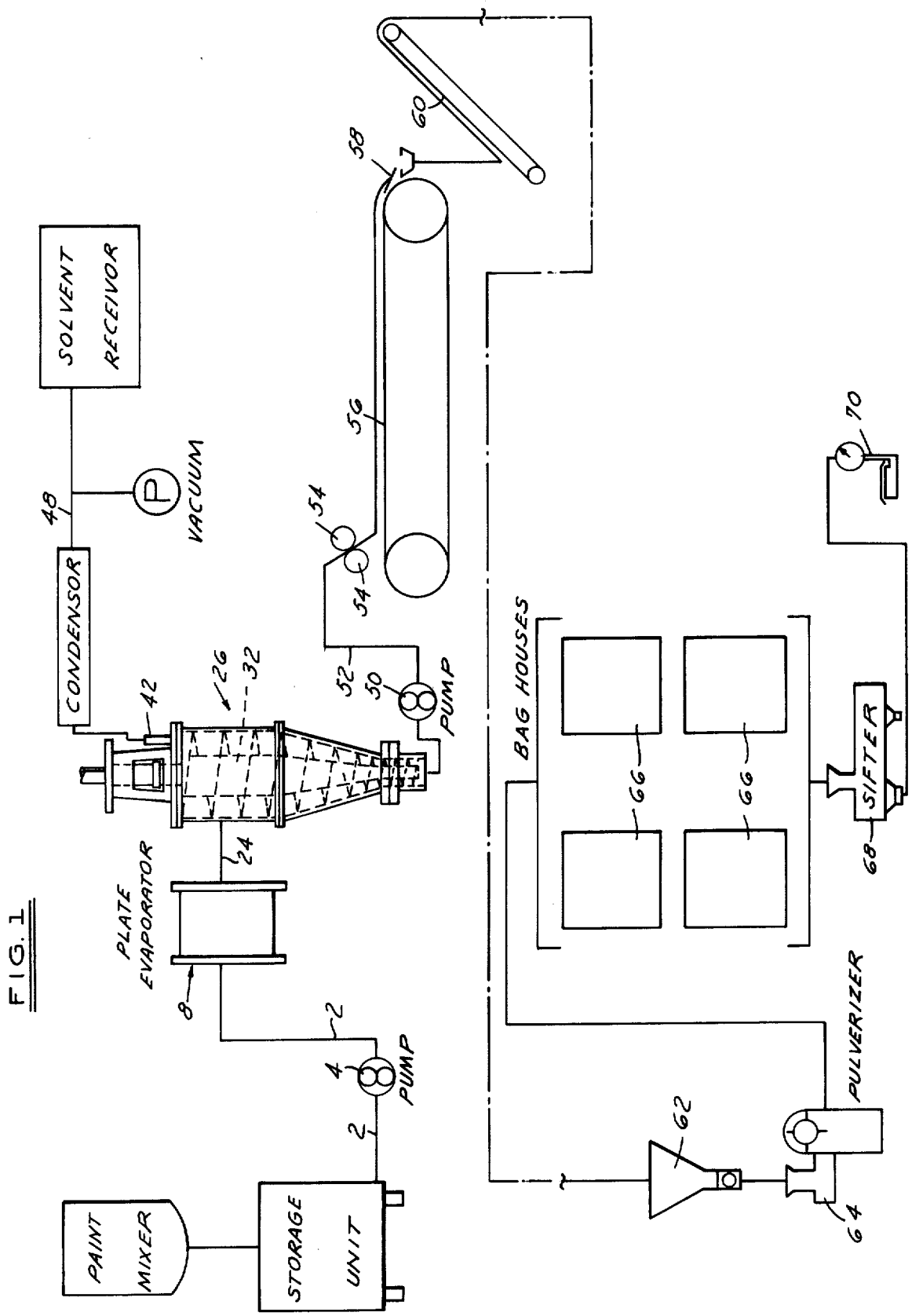
FIG. 1 shows a schematic diagram of an apparatus suitable for carrying out the invention.

Compositions Useful In The Process of the Invention

Compositions which may be processed by the method of this invention are liquids containing all or nearly all ingredients of the desired powder paint dissolved in inert solvent. Various known liquid paints including those containing epoxy and polyester copolymers as well as the preferred acrylic copolymers may be employed as long as the copolymers have the appropriate glass transition temperatures and molecular weights for forming powders.

Exemplary of a type of liquid paint composition which does not form a suitable powder paint when processed in accordance with this invention is that disclosed in U.S. Pat. No. 2,857,354. The paints of Examples 4 and 5 of that patent do not form dry powders when processed in accordance with this invention while powders prepared from the compositions of Examples 1, 2, 3 and 6, when deposited on a metal panel, do not fuse together to form a smooth film when the panels are baked at 150°C to 200°C for 20 minutes. The baked coatings exhibit poor adhesion, lack of flexibility and very low gloss.

Preferably, the copolymers of the liquid compositions useful in the process have a glass transition temperature (Tg) in the range of 40°C to 90°C and a number average molecular weight ($\overline{M}_n$) of between about 1,000 and about 15,000. More preferably, the copolymer should have a molecular weight of between about 2,000 and about 8,500. A preferred glass transition temperature is between about 50°C and about 80°C with a molecular weight ($\overline{M}_n$) in the range of 3,000 to 6,500. The most preferred glass transition temperature, however, is 55°C to 70°C with a molecular weight ($\overline{M}_n$) in the range of 3,000 to 4,000.

Pigment preferably is dispersed in the copolymer solution, thus facilitating uniform and accurate color and shade matching prior to forming the powder. The pigmented liquid may be applied to test panels and compared with standard panels for color and shade match in accordance with procedures known to those skilled in the art of color matching liquid paints.

The copolymer solution may also include a flow control agent. Such flow control agents should have a molecular weight above about 100. Preferably, however, the molecular weight ($\overline{M}_n$) should be above about 1,000 and most preferably between about 6,000 and about 20,000. Still further, a crosslinking agent for said copolymer as well as various other additives such as catalysts and antistatic agents may be dispersed or dissolved in the copolymer solution. These materials may be mixed with the uniformly pigmented powder after processing, if desired. However, the quality of coating obtained from the powders is generally greater if these materials are dispersed prior to processing. The superior quality is a result of the more thorough and uniform dispersion of additives.

As mentioned above, the preferred liquids for processing in accordance with this invention contain acrylic copolymers. These acrylic copolymers may be self-crosslinking or they may be crosslinked by suitable crosslinking agents. Exemplary of the copolymers which may be included in liquid compositions processed by the method of this invention are those disclosed in U.S. Pat. No. 3,730,930; applications Ser. Nos. 172,222 (now U.S. Pat. No. 3,758,635); 172,223; 172,224 (now U.S. Pat. No. 3,781,3790); 172,225 (now U.S. Pat. No. 3,787,520); 172,226 (now U.S. Pat. No. 3,758,633); 172,288 (now U.S. Pat. No. 3,758,634); 172,229 (now U.S. Pat. No. 3,781,380); 172,235 (now U.S. Pat. No. 3,758,632); 172,236 (now U.S. Pat. No. 3,752,870); and 172,237 (now U.S. Pat. No. 3,787,340), all of which were filed Aug. 16, 1971; and applications Ser. Nos. 394,874; 394,879; 394,880 and 394,881 filed Sept. 6, 1973. The copolymers of each of the paints disclosed in these applications bears crosslinkable functional groups selected from epoxy, hydroxyl, amide and carboxyl groups. In addition, each of the paints disclosed in these applications may include the above mentioned additives such as flow control agents, pigments, catalysts, antistatic agents, plasticizers, and crosslinking agents if necessary and these too may be included in the liquid paints being processed.

As noted above, the liquid compositions which may be processed by this invention include all or nearly all of the components of the desired final powder paint. Thus, the chemistry recited in the above noted patent and applications applies equally to the liquid compositions of this invention, the sole difference being the inclusion of inert solvent in this invention which is ultimately removed. For a more complete description of the preferred compositions for processing in accordance with this invention reference is made to the above-identified applications and patent, the disclosures of which are incorporated herein by reference.

Method of Processing Compositions

The liquid composition, preferably including at least a copolymer containing crosslinkable functional groups as defined above, a pigment, a flow control agent, and a crosslinking agent dispersed in an inert solvent, is introduced into a suitable apparatus for converting the liquid paint to a powder. Of course, as mentioned above, the liquid composition need not contain a crosslinking agent. In those instances where the copolymer is self-crosslinking a crosslinking agent, of course, is not necessary. Also, in those cases where there is danger of substantial crosslinking during processing it may be desirable to add the crosslinking agent subsequent to devolatilization.

The preferred apparatus for performing this function is a modification of an evaporating and separating system disclosed in U.S. Pat. No. 3,073,380 dated Jan. 15, 1963. While certain portions of that patent disclosure will be discussed in greater detail hereinafter, the disclosure of the patent is incorporated herein by reference. It should be appreciated that this disclosure is included merely as an example of a suitable type of evaporating and separating system for modification in accordance with the teachings of this disclosure.

Referring to FIG. 1, the liquid composition is charged to a mixer, so indicated, and there agitated to maintain a complete and uniform dispersion of pigment, crosslinking agent and other various additives. From the mixer the liquid is conveyed to a storage unit, with only a sufficient amount of the composition being maintained in the storage unit to allow continuous feed of material to the remainder of the apparatus. From the storage unit the liquid is fed through pipe 2 by a variable speed positive displacement pump 4 to an evaporating zone, which may comprise plate evaporator 8, at a rate which preferably ranges from about 200 to about 500 pounds per hour, with the most preferred rate of feed being about 400 pounds per hour. As the liquid is conveyed from the storage unit by the variable speed pump 4, it may be passed through a strainer, not shown, to remove any foreign matter.

While the liquid composition is in the plate evaporator 8, inert solvent and other volatile impurities are evaporated as the composition passes between the plates which form a tortuous passageway. The material passes through the evaporator as a homogeneous mixture of the vapors of the volatile components and dispersed particles of molten polymer and additives.

Figure 2:
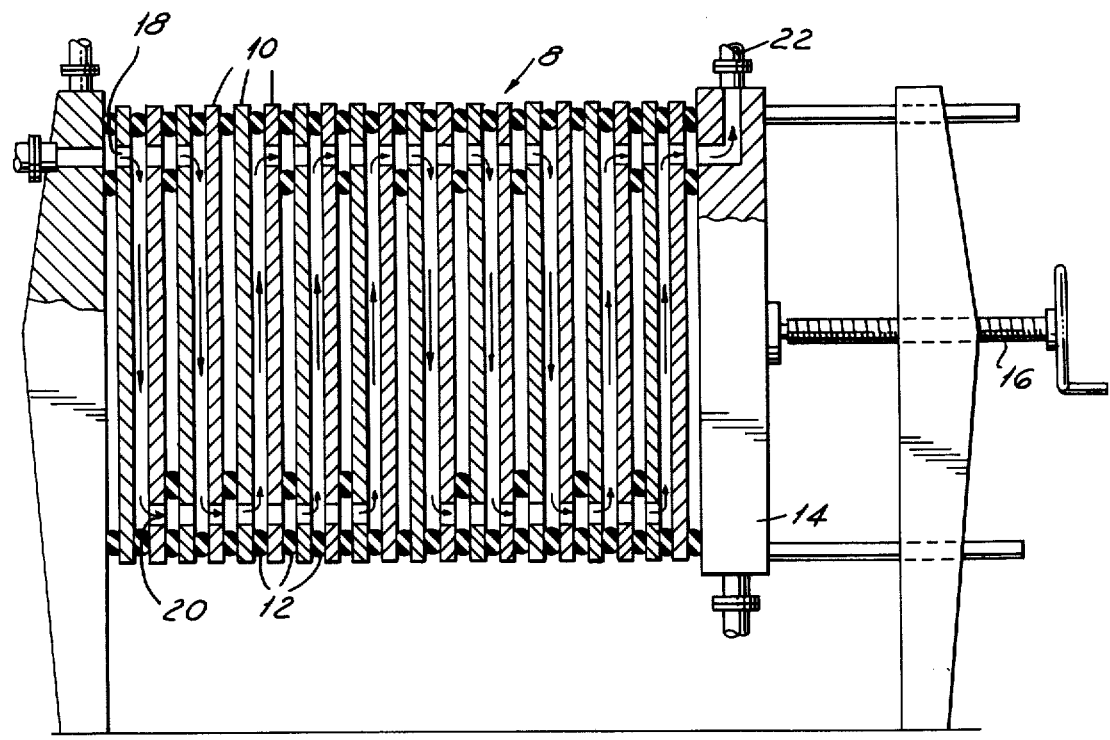
FIG. 2 shows an enlarged partial cross-sectional view of the evaporating means of FIG. 1.

The plate evaporator, the plate arrangement of which is shown in partial cross section in FIG. 2, comprises a plurality of plates 10 which are arranged in spaced relationship by gaskets 12. The plates are formed as a compact unit in frame 14 by compression means 16 which compress the plates against gaskets 12. This arrangement defines a plurality of spaces which form alternate material and heating medium passageways. The first plate of a pair forming a material passageway has an inlet port 18 and the second plate has an outlet port 10. By the use of the gaskets 12, alternate spaces are arranged for the flow of the heating medium such as super heated steam, or the like.

As indicated above, alternate passageways of the evaporator 8 provide a path for a heating medium such as super heated steam so that liquid paint passed through the remaining passageway may be heated so as to vaporize volatile components. The heating medium should heat the composition to a temperature (1) above the temperature at which the inert solvent begins to vaporize; (2) above the melting point of the copolymer, but below the point at which degradation occurs; and (3) below the temperature at which gelling occurs. The temperature at which the different compositions may be processed will depend on the inert solvents employed, the crosslinking agent, etc. Broadly, the compositions within the purview of this invention may be processed between about 140°F and about 600°F. Preferably, however, the evaporating zone temperature is maintained above about 220°F and more preferably, the temperature is maintained between about 250°F and about 395°F.

In operation the heat evaporator depicted in the drawing is arranged in so-called "material" passes wherein a gasket held between the upstream face of one plate and the downstream face of the preceding plate guides the liquid composition and generated vapor from volatile components from an inlet opening at one extremity of one plate to a discharge opening at the opposite extremity of an adjacent downstream plate. Turbulent flow of the liquid composition is rapidly induced by its passage through the extremely small cross-sectional area of the passageway as it contacts the relatively large surface through which the heat is passed. Under these conditions, temperature of the material rises rapidly to a point where the vapor is generated. Abrupt changes in flow direction and the velocity of the material maintain the vapor in intimate mixture with the molten polymer components at all times while the material is within the heating or evaporating zone. This velocity and turbulence insures good heat exchange and causes a high degree of volatilization as well as thorough mixing of all nonvolatile components. Turbulence also almost entirely inhibits the deposition of solid materials in a manner which normally results from evaporation of a delicate material on a hot surface.

The homogeneous mixture of volatile components and molten components in combination passes from outlet 22 and into a separating zone which may comprise a conical separator 26. A suitable conical separator for use in the process of the invention is sold by Marco Development Co., Inc. of New Castle, Delaware. The temperature in the conical separator, shown in greater detail in FIG. 3, is maintained above the melting point of the non-volatile components and above the volatilization temperature of the solvent.

Separator 26 is heated by transfer jackets 28 through which a heating medium is passed via heat transfer fluid ports 30. Disposed within conical separator 26 is tapered screw 32 which is disposed on shaft 34 which in turn is connected to drive means not shown. Shaft 34 turns tapered screw 32 at between about 400 and about 700 revolutions per minute, preferably at about 500 revolutions per minute. The homogeneous mixture from pipe 24 enters conical separator 26 through material inlet port 36. Centrifugal force causes the material to move rapidly to the outside of screw 32 and contact housing wall 38. Material is continuously worked between the screw face at the outside and the housing wall, continuously breaking down any foaming and exposing new surfaces to complete vapor removal. Nonvolatile components of the mixture move forward along the wall and are mechanically forced downward by screw 32 toward outlet port 40. Concurrently, volatiles move toward vapor removal or vacuum port 42.

The area of screw 32 adjacent to inlet port 36 has a large disengaging area to handle the large gas volume and the possible foaming. As the material progresses down screw 32, it occupies less space and gives off less volatiles. The end of screw 32 is a short pumping screw 44 in extruder section housing 46 through which the nonvolatile molten material is extruded prior to passing through opening 40. Even though a vacuum is applied to separator 26 molten material, after having been driven down separator 26 by screw 32, is under a pressure of between of about 40 and about 70 pounds per square inch, preferably 55 pounds per square inch, when it passes into the extrusion zone and passes through opening 40. It can readily be appreciated that by employing a separating unit with such a screw or drive means which will mechanically force the nonvolatile material through an opening, the nonvolatile material may be processed much more rapidly than is the case when the outlet from the separator is merely controlled by gravity. Thus, since the molten material does not gather into an appreciable pool awaiting an opportunity to flow to a cooling zone, problems of premature crosslinking or copolymer degradation are substantially alleviated.

Volatile components of the mixture fed into conical separator 26 are removed through pipe 42 and condensed in the condenser, indicated in FIG. 1. Condensed volatiles pass through pipe 48 to a solvent receiver. A reduced pressure of between about 10 mm HG and about 500 mm HG is maintained by means of a vacuum pump which draws a vacuum through pipe 48, conduit 42 and conical separator 26. Thus, the separating zone is maintained under reduced pressure to assist in the removal of the volatile components. Since pipe 24 to plate evaporator 8 is maintained in an open state, a reduced pressure is also maintained within plate evaporator 8. This reduced pressure increases the speed with which the material may be passed through the evaporating zone and also effects more complete vaporization of the volatile components.

After molten nonvolatile material is driven through outlet 40 of the conical separator 26, it is drawn by means of variable speed pump 50 through line 52 and is conveyed by distributing rolls 54 onto chilled belt 56 where the molten material is cooled below its melting point and forms a solid sheet material. Material falling off the end of chill belt 56 is broken by means of doctor blade 58 and falls onto conveyor 60. Conveyor 60 carries the material to hopper 62 through which it falls into pulverizer 64. Pulverizer 64 grinds the material to the appropriate size for use as a powder paint, e.g., between about 100 mesh and about 400 mesh, and the powder is then conveyed by vacuum to bag house 66. The powder is passed through sifter 68 for classification according to particle size and is then conveyed to weighing station 70.

It should be appreciated, as indicated above, that it is within the scope of this invention to employ other apparatus which will accomplish the same steps of evaporating and separating the various components of the liquid paint composition. Further it should be understood that the following specific examples are presented by way of illustration and not by way of limitation.

EXAMPLE I

A powder paint composition is prepared in the manner set forth below:

Preparation of Resin Solution A

A reaction flask equipped with a stirrer, thermometer, water condenser and monomer addition funnel is charged with 100 parts by weight of toluene and heated to refluxing temperature of about 110°C. A mixture of 15 parts by weight of glycidyl methacrylate, 45 parts by weight of methyl methacrylate, 40 parts by weight of butyl methacrylate and 3 parts by weight of t-butyl peroctoate is added dropwise through the monomer addition funnel over a period of about 3 hours while agitating and keeping the temperature at reflux. Refluxing is then continued for an additional 3 hours after which time the monomers have converted essentially completely to polymer. The resulting resin solution has a Gardner Holdt bubble viscosity of F to H at 25°C.

Preparation of Pigment Millbase

A titanium dioxide pigment millbase is prepared by sand grinding 60 parts by weight of titanium dioxide, 30 parts by weight of Resin Solution A and 10 parts by weight of toluene to a Hegman fineness of 7.5 plus.

Preparation of Pigmented Solution

A white solution is prepared by mixing 45 parts by weight of the titanium dioxide pigment millbase with 57 parts by weight of Resin Solution A, 0.3 parts of polylauryl acrylate ($\overline{M}_n$=10,000), and 3.5 parts by weight of azelic acid crosslinking agent dissolved in a 20% solution of methanol under agitation for 20 minutes.

This white solution is color matched to the desired shade of white with traces of colored pigment millbase by repeatedly applying to test panels.

Preparation of Powder

The above solution is charged into a feed tank where it is constantly stirred with an agitator. The solution is then fed through a feed pipe with a variable speed positive displacement pump at a rate of 400 pounds per hour to a plate heat exchanger which is heated with super heated steam at 140 psi so as to maintain a temperature of 340°–350°F. The volatile components of the solution, which consist of toluene and small amounts of unreacted monomers and impurities, are vaporized in the plate heat exchanger to form a two fluid flow of a superheated vapor continuous phase of the volatile components and a discontinuous phase of the non-volatile components of the paint solution. The non-volatile components including copolymer, flow control agent, pigment and crosslinking agent are suspended in the vapor phase and are exposed continuously to new heated surface resulting in an increasingly concentrated liquid.

The mixture of volatile and non-volatile components passes from the plate heat exchanger and into a conical separator which is heated by the same superheated steam as above flowing through jackets aroung the separator. A reduced pressure of about 30 mm Hg is maintained in the separator. The separator into which the mixture of volatile and molten non-volatile components is fed is a conical chamber having a tapered screw disposed therein. The tapered screw turns at a rate of 500 revolutions per minute and drives the molten non-volatile materials down the conical chamber through an outlet plate at a rate of 130 lbs/hr. The inlet temperature of the mixture of volatile and non-volatile components is between about 171°C and about 176°C. The wall temperature of the conical separator is maintained at about 180°C and the outlet temperature of the molten non-volatile material is about 130°C. Even though a vacuum is drawn on the separator, the non-volatile material is driven from the separator by the screw at a pressure of approximately 55 psi. The volatile components of the mixture are condensed in a water jacket condenser and collected in a receiving tank. The molten polymer is then pumped to a chilled belt fitted with a distributing roll for quick quenching to solid form. The solid product is removed from the chilled belt by a doctor blade and deposited in a product bin from which it is conveyed to a pulverizer for milling.

Coating of Substrates

The pigmented powder paint composition is sprayed onto electrically grounded steel panels using an electrostatic powder spray gun operating at 50 KV charging voltage. After spraying, the panel is heated at 175°C for 20 minutes. The paint exhibits good exterior durability, adhesion, impact strength and excellent color match. The same paint composition also exhibits good adhesion on panels of glass, brass, zinc, aluminum, copper and bronze.

EXAMPLE II

A powder paint composition is prepared in the manner set forth below:

Preparation of Resin Solution A

A reaction flask equipped with a stirrer, thermometer, water condenser and monomer addition funnel is charged with 100 parts by weight of methyl ethyl ketone and heated to refluxing temperature of about 80°C. A mixture of 42 parts by weight of methyl methacrylate, 18 parts by weight of glycidyl acrylate, 40 parts by weight of butyl methacrylate and 3 parts by weight of t-butyl peroctoate is added dropwise through the monomer addition funnel over a period of about 3 hours while agitating and keeping the solvent at reflux. Refluxing is then continued for an additional 3 hours after which time the monomers have converted essentially completely to polymer.

Preparation of Pigment Millbase

A titanium dioxide pigment millbase is prepared by dispersing 60 parts by weight of titanium dioxide, 30 parts by weight of Resin Solution A and 10 parts by weight of methyl ethyl ketone.

A pastel millbase is prepared by dispersing 10 parts by weight of chromium green oxide with 70 parts of Resin Solution A and 20 parts of methyl ethyl ketone.

Preparation of Pigmented Solution

A pastel green solution is prepared by mixing 17.8 parts by weight of the titanium dioxide pigment millbase with 69.1 parts by weight of Resin Solution A, 2.7 parts of chromium green oxide millbase and 0.3 parts of polylauryl acrylate ($\overline{M}_n$=10,000) and 3.9 parts by weight of adipic acid crosslinking agent dissolved in a 20% solution of methanol under agitation for 20 minutes.

The green solution is applied to test panels and color matched to the desired shade of green with traces of millbase.

Preparation of Powder

The above solution is fed through a plate evaporator as described in Example I at a rate of 400 pounds per hour. The temperature within the plate heat evaporator is maintained at about 250°F (121°C). The mixture of vapor and non-volatile components is then fed into a conical separator which is maintained at a reduced pressure of 60 mm Hg. The temperature of the separator is maintained at about 121°C (250°F) and the screw speed is set at 600 revolutions per minute. The molten non-volatile material is driven from the separator, cooled and pulverized as per Example I.

Coating of Substrates

The pigmented powder paint composition is sprayed onto electrically grounded steel panels using an electrostatic powder spray gun operating at 50 KV. After spraying, the panel is heated at 170°C for 20 minutes. The paint exhibits good adhesion, good impact, strength and excellent color match. The same paint composition also exhibits good adhesion on panels of glass, brass, zinc, aluminum, copper and bronze.

EXAMPLE III

A powder paint composition is prepared in the manner set forth below:

A monomer mixture having the following composition is prepared: glycidyl methacrylate 15% by weight, butyl acrylate 20% by weight and methyl methacrylate 65% by weight. Four weight percent of a catalyst 2,2'-azobis-(2)methylpropionitrile) (AIBN) is dissolved in the monomer mixture. The mixture is slowly added to refluxing toluene (100 parts) which is stirred vigorously under a nitrogen atmosphere. A condenser is provided at the top of the toluene container to condense the toluene vapors and return them to the container. The monomer mixture is added through a regulating valve and the rate of addition is controlled to maintain a reflux temperature with only a small fraction of heat supplied from an external heater. After the addition of the monomer mixture is complete, the refluxing is maintained by external heat for 3 additional hours. The polymer has a glass transition temperature of 65°C and a molecular weight ($\overline{M}_n$) of 3,000.

Preparation of the Millbase

A titanium dioxide pigment millbase is prepared by sand grinding 60 parts of titanium dioxide, 30 parts of the above resin solution and 10 parts of toluene.

A blue mill base is prepared by sand grinding 10 parts of blue phthaloycanine pigment with 70 parts of the resin solution and 20 parts of toluene.

Preparation of Pigmented Solution

A pastel blue solution is prepared by mixing 17.8 parts by weight of titanium dioxide pigment millbase with 69.1 parts by weight of the resin solution, 2.7 parts by weight of the blue millbase, 0.038 parts by weight of triethylene diamine, 0.109 parts by weight of tetraethyl ammonium chloride, 0.76 parts by weight of polylauryl methacrylate ($\overline{M}_n$=6,000) and 3.54 parts by weight of suberic acid crosslinking agent.

Preparation of Powder

The above solution is fed through a plate evaporator and separator as in Example I. After being driven from the conical separator by the rotating tapered screw, the molten non-volatile material is pumped to a chilled belt, cooled to a solid state and then pulverized.

Coating of Substrates

The above powder composition is sprayed electrostatically on various substrates as per Example I and cured by heating to 150°C for 15 minutes. The coating obtained has good adhesion to steel, glass, brass, zinc, aluminum, copper and bronze. The coatings also exhibit good impact and excellent color match.

EXAMPLE IV

A powder paint composition is prepared as follows: A monomer mixture having the following composition is prepared: glycidyl methacrylate 15% by weight, methyl methacrylate 45% by weight and butyl methacrylate 40% by weight. Three weight percent of the catalyst AIBN is dissolved in the monomer mixture which is then slowly added to refluxing toluene and processed in the manner set forth in Example II to form a copolymer having a glass transition temperature of 53°C and a average molecular weight ($\overline{M}_n$) of 4,000.

A titanium dioxide pigment millbase is prepared by sand grinding 60 parts by weight of titanium dioxide, 30 parts by weight of the above resin solution and 10 parts by weight of toluene.

A white solution is prepared by mixing 45 parts by weight of the titanium dioxide pigment millbase with 57 parts by weight of the above resin solution, 0.07 parts by weight of tetrabutyl ammonium bromide, 0.175 parts by weight of polylauryl acrylate ($\overline{M}_n$=10,000), 0.74 parts of lauric acid and 3.17 parts of azelaic acid. This white solution is applied to test panels and color matched to the desired shade of white with traces of colored pigment millbase.

This paint solution is next processed through the plate heat exchanger discussed in Example I with the exception that the temperature within the evaporating zone is maintained at 450°F. The mixture of volatile and non-volatile components exiting from the evaporating zone are fed into the conical separator, the walls of which are maintained at 232°C. A pressure of about 120 mm Hg is maintained in the separator chamber. The speed of the tapered screw is set at 700 revolutions per minute and the molten non-volatile material is driven through the outlet plate under a pressure of about 70 pounds per square inch.

After exiting from the separator, the molten paint composition is fed from the separator, cooled and pulverized to form a uniformly pigmented powder.

The powder paint composition containing crosslinking agent is electrostatically applied to various substrates which are then heated to 175°C for 20 minutes. The coating composition exhibits good adhesion, impact strength, and color match.

EXAMPLE V

A powder paint composition is prepared in the manner set forth below:

The same copolymer as prepared in example IV is employed in the paint composition of this Example. A titanium dioxide pigment millbase is prepared by sand grinding 60 parts of titanium dioxide, 30 parts of the resin solution and 10 parts of toluene. A yellow millbase is prepared by grinding 10 parts of ferrite yellow pigment with 70 parts of resin solution and 20 parts of toluene.

A pastel yellow solution is prepared by mixing 17.8 parts by weight of titanium dioxide pigment millbase with 69.1 parts of the resin solution, 2.7 parts of the yellow millbase, 0.076 parts of tetrabutyl ammonium bromide, 0.190 parts of polylauryl acrylate ($\overline{M}_n$=10,000) and 4.58 Parts of Bisphenol A crosslinking agent. This solution is applied to various test panels and matched for color and shade against standard panels.

The color matched solution is next processed to a pulverized powder in accordance with the processing techniques set forth in Example I with the exception that the tapered screw within the separator is set at 350 revolutions per minute and the pressure maintained in the separator is 75 mm Hg. The resulting powder is classified by particle size and applied to an electrically grounded, steel panel by using an electrostatic powder spray gun operating at 50 KV charging voltage. After spraying, the panel is heated at 175°C for 20 minutes. The coating obtained on the panel has good adhesion, impact resistance and color match as well as good resistance to toluene, gasoline, butanone or methanol.

EXAMPLE VI

A powder paint composition is prepared as follows: A monomer mixture having the following composition is prepared: glycidyl methacrylate 15% by weight, methyl methacrylate 50% by weight and styrene 35% by weight. The monomers are reacted in accordance with the procedure set forth in Example V with 3% by weight of the catalyst AIBN being used. The resultant copolymer has a molecular weight of 4,500 and a glass transition temperature of 90°C.

A titanium dioxide pigment mill base is prepared by sand grinding 60 parts of titanium dioxide, 30 parts of the above resin solution and 10 parts of toluene. A yellow millbase is prepared by sand grinding 10 parts of ferrite yellow with 70 parts of the resin solution and 20 parts of toluene.

A pastel yellow solution is prepared by mixing 17.8 parts of the titanium dioxide pigment millbase with 69.1 parts of the resin solution, 2.7 parts of the yellow millbase, 0.38 parts of tetramethyl ammonium chloride, 0.76 parts of poly(2-ethylhexyl acrylate) and 14.9 parts by weight of a carboxy terminated crosslinking agent. The crosslinking agent is prepared as follows: five hundred grams of Epon 1,001 (epoxide equivalent 500 g) is charged into a 500 ml stainless steel beaker having a heating mantle. The epoxy resin is heated to 110°C. As the epoxy resin is stirred, 194 grams of azelaic acid is added. After a reaction time of 30 minutes, a homogeneous mixture is obtained. The mixture resin, only semireacted, is poured out into an aluminum pan and cooled. The solid mixture is pulverized to pass through a 100 mesh screen by use of a blender. The liquid composition including the copolymers, catalyst, pigment, flow control agent and crosslinking agent is sprayed on various test panels and color matched with additional pigment. The paint is then processed to powder form through evaporating and separating means as described in Example I.

The powder paint composition prepared as above is applied to various substrates electrostatically and heated to a temperature of 170°C for a period of 30 minutes. The coatings exhibit good adhesion, impact resistance and color match.

EXAMPLE VII

A powder paint composition is prepared as follows:

The monomers, glycidyl methacrylate 15% by weight, methyl ethacrylate 45% by weight and butyl methacrylate 40% by weight are mixed together. Three percent by weight of the catalyst AIBN is dissolved in the monomer mixture. The mixture is slowly added to refluxing sec-butyl alcohol (100 parts) which is stirred vigorously under a nitrogen atmosphere. A condenser is provided at the top of the alcohol container to condense the alcohol vapors and return them to the container. The monomer mixture is added through a regulating valve and the rate of addition is controlled to maintain a reflux temperature with only a small fraction of heat supplied from an external heater. After the addition of the monomer is complete, refluxing is maintained by external heat source for three additional hours. The copolymer formed by such a solution polymerization process has a glass transition temperature of 53°C and a molecular weight ($\overline{M}_n$=4,000).

A titanium dioxide pigment millbase is prepared by sand grinding 60 parts by weight of titanium dioxide, 30 parts of the above resin solution and 10 parts by weight of sec-butyl alcohol. A pigmented solution is prepared by mixing 45 parts by weight of the titanium dioxide pigment millbase with 57 parts by weight of the resin solution, 0.076 parts of tetrabutyl ammonium bromide, and 0.175 parts of polylauryl acrylate ($\overline{M}_n$=10,000) and 14.9 parts of a phenolic hydroxy terminated crosslinking agent as discussed in Ser. No. 172,225. This solution is processed in accordance with the procedure set forth in Example I with the exception that the temperature within the evaporating and separating zones is maintained at 180°F, the vacuum drawn on the separator is maintained at 25 mm Hg and the tapered screw speed is set at 700 rpm.

The powder paint composition prepared as above is applied to various substrates and heated to a temperature of 175°C for 20 minutes. The coatings exhibit good adhesion, impact strength and color match.

EXAMPLE VIII

A powder paint composition is prepared as follows:

The monomers, 2-hydroxyethyl methacrylate 10% by weight, methacrylic acid 6.7% by weight, methyl methacrylate 43.3% by weight, butyl methacrylate 40% by weight are blended to form a mixture and 4 grams of t-butylperoxypivate initiator is added. One hundred parts by weight of benzene is charged into a one liter flask which is equipped with a dropping funnel, condenser, stirrer, thermometer and nitrogen inlet. The monomer mixture is placed in the dropping funnel. The flask is heated to 80°C to reflux the solvent. While maintaining the reaction temperature at 80°C, the monomer mixture is added in a dropwise fashion over a 2 hour period. After the addition is complete, the reaction is continued for another 2 hour period. The contents of the flask are cooled to room temperature.

A titanium dioxide pigment millbase is prepared by blending 60 parts of titanium dioxide, 30 parts of the above resin solution and 10 parts of benzene. A green millbase is prepared by mixing 10 parts of green phthaloycanine pigment with 70 parts of the resin solution and 20parts of benzene.

A pastel green solution is prepared by mixing 17.8 parts by weight of the titanium dioxide pigment millbase with 69.1 parts of the resin solution, 2.7 parts of the green millbase, 7.7 parts of poly(2-ethylhexyl acrylate) ($\overline{M}_n$=9,000) and 0.38 parts of phosphoric acid. This paint solution is processed in accordance with the procedure set forth in Example I with the exception that the heat in the plate heat exchanger and separator is maintained at 200°F, the pressure in the separator is maintained at 15 mm Hg and the speed of the tapered screw is set at 575 rpm.

The pulverized powder obtained from this process is applied to various substrates and cured by heating to 175°C for a period of 20 minutes. The coatings obtained show good adhesion, impact resistance and color match.

EXAMPLE IX

A powder paint composition is prepared as follows:

The following mixture of monomers is prepared: glycidyl methacrylate 5% by weight, methyl methacrylate 55% by weight and butyl methacrylate 40% by weight. Three weight percent of the catalyst AIBN is mixed with the monomers and the entire mixture is dissolved in 100 parts of toluene. The reaction is carried out in accordance with the procedure set forth in Example V and the resultant copolymer has a glass transition temperature of 58°C and a molecular weight of 4,000.

A titanium dioxide pigment mill base is prepared by mixing 60 parts of the resin solution and 10 parts of toluene. A red millbase is prepared by mixing 10 parts of quino red pigment with 70 parts of the resin solution and 20 parts of toluene.

A red solution is prepared by mixing 17.8 parts by weight of titanium dioxide pigment millbase with 69.1 parts of the resin solution, 2.7 parts of the red mill base, 0.76 parts of tetrabutyl ammonium bromide and 0.190 parts of polylauryl acrylate ($\overline{M}_n$=10,000) and 3.0 parts of poly(azelaic anhydride). This paint solution is sprayed onto test panels and color and shade matched with standard panels. After this matching the solution is processed to a powder form in accordance with the procedure set forth in Example I.

After the solid material has been pulverized to powder form it is electrostatically deposited on various substrates. The coatings exhibit good adhesion, good impact strength and color and shade matching.

EXAMPLE X

A powder paint composition is prepared as follow:

The following monomers are mixed together: 2-hydroxyethyl methacrylate 15 parts, ethyl acrylate 25 parts, methyl methacrylate 60 parts. To this mixture is added 4 parts of AIBN. A one liter, four-necked flask containing 50 ml of toluene and 50 ml of methyl ethyl ketone is heated to a reflux temperature of 85°C. The monomer mixture is added in dropwise fashion over a period of 1 and a ½ hours to the reaction mixture which is maintained at 85°C. After the monomer addition is complete, 0.5 grams of AIBN is added and the refluxing is continued for an additional one half hour to complete the polymerization.

A titanium dioxide pigment millbase is prepared by blending 60 parts of titanium dioxide, 30 parts of the above resin solution and 10 parts of toluene.

A white solution is prepared by mixing 45 parts by weight of the titanium dioxide millbase, 57 parts of the above resin solution, 0.28 parts of zinc chloride, 0.245 parts of polylauryl acrylate ($\overline{M}_n$=5,000). This pigmented solution is mixed thoroughly and applied to test panels for color matching. The pigmented solution is then processed to powder in accordance with the procedure set forth in Example I. The powder is then applied by electrostatic spraying to various substrates.

EXAMPLE XI

A powder paint composition is prepared as follows:

A monomer mixture having the following composition is formed: glycidyl methacrylate 18% by weight, ethyl acrylate 20% by weight, methyl methacrylate 40% by weight and vinyl chloride 22% by weight. The monomer mixture is polymerized in accordance with the procedures set forth in Example III using 2% by weight of the catalyst AIBN as the initiator.

A titanium dioxide pigment millbase is prepared as in the foregoing examples but with the above resin solution. A pigmented liquid composition prepared by blending 45 parts of the mill base with 57 parts of the above resin solution, 0.35 parts of trimethyl benzyl ammonium chloride 0.7 parts of poly(2-ethylhexyl acrylate) ($\overline{M}_n$=11,000) and .7 parts of N,N dimethylaniline. This liquid paint composition is sprayed on test panels and odor and shade matched by adding small amounts of colored pigment.

This liquid composition is then reduced to powder form by processing in accordance with the procedures set forth in Example I. The resultant powder is applied to various substrates and heated at 170°C for 15 minutes.

EXAMPLE XII

A powder paint composition is prepared as follows:

The following monomer mixture is prepared: methacrylic acid 5% by weight, methyl methacrylate 50% by weight and butyl methacrylate 45% by weight. This monomer mixture is polymerized in accordance with the procedure set forth in Example III with three weight percent of AIBN added as a catalyst.

Titanium dioxide and blue pigment millbases are prepared as in the foregoing examples but with the above resin solution. A pigmented liquid composition is prepared by mixing 17.8 parts of the titanium dioxide millbase, 69.1 parts of the resin solution, 2.7 parts of the blue millbase, 0.076 parts of tetrabutyl ammonium bromide, 0.190 parts of polylauryl acrylate ($\overline{M}_n$=10,000) and 9.9 parts of Epon 1,001 (see page 4–66 of *Handbook of Epoxy Resins*). The copolymer so obtained has a Tg of 53°C and a molecular weight ($\overline{M}_n$) of 4,000. This liquid composition is sprayed on test panels and color matched. The liquid is then processed to a powder in accordace with the procedures of Example I with the exception that the temperature in the evaporating and separating zones is maintained at 220°F, the pressure in the separating zone is maintained at 50 mm Hg and the speed of the tapered screw is set at 425 rpm. The resultant powder paint composition is applied to various substrates and cured by heating to 175°C for 20 minutes.

EXAMPLE XIII

A powder paint composition is prepared as follows:

The monomers, maleic anhydride 4 parts, styrene 4 parts, glycidyl methacrylate 6 parts, methyl methacrylate 46 parts and butyl methacrylate 40 parts are blended with 3 parts of the initiator t-butylperoxypivalate. 100 parts of benzene is charged into a one liter flask which is equipped with a dropping funnel, condenser, stirrer, thermometer and nitrogen inlet. The monomer mixture is placed in the dropping funnel and the flask is heated to 80°C to reflux. While maintaining the reaction temperature at 80°C, the monomer is added in a dropwise fashion over a 2 hour period. After the addition is complete, the reaction is continued for another 2 hours. The contents of the flask are then cooled to room temperature.

A pigmented solution is formed from this solution by combining 45 parts of a titanium dioxide millbase formed from the resin, 57 parts of the resin solution and 0.105 parts of poly(2-ethylhexyl acrylate) ($\overline{M}_n$=9,000). This liquid is then processed to powder in accordance with the procedure of Example I with the exception that the temperature is maintained at 300°F in the evaporating and separating zones and the tapered screw speed is set at 350 rpm. The powder formed is applied to various substrates and cured by heating to 175°C for 20 minutes.

In view of this disclosure, many modifications of this invention will be apparent to those skilled in the art. It is intended that all such modifications which fall within the true scope of this invention be included within the terms of the appended claims.

We claim:

1. A method of preparing a powder paint composition comprising:
   A. introducing a liquid composition comprising a solution of inert solvent and a copolymer containing crosslinkable functional groups, having a glass transition temperature in the range of 40° to 90°C and a number average molecular weight of between about 1,000 to about 15,000, into an evaporating zone adapted to heat said solution so as to evaporate said inert solvent;
   B. heating said solution while confining the same within said evaporating zone to a temperature
      1. above the melting point of said copolymer but below the point at which degradation occurs;
      2. above the temperature at which said inert solvent begins to vaporize, thus inducing turbulent flow of said solution within said evaporating zone and thereby maintaining an intimate homogeneous mixture of the vapors of the volatile components of said solution and the dispersed particles of molten copolymer;

C. passing said homogeneous mixture from said evaporating zone into a separating zone and, while maintaining the temperature within said separating zone above the melting point of said copolymer,
   1. causing said solvent vapor to be removed from said separating zone; and
   2. mechanically driving said nonvolatile components while in the molten state from said separating zone;
D. cooling said non-volatile components to form a solid material; and
E. pulverizing said solid material to form a homogeneous powder.

2. A method in accordance with claim 1 wherein said separating zone comprises a conical chamber containing a tapered rotating screw and wherein said nonvolatile material is mechanically driven down said rotating screw and out of said conical chamber.

3. A method in accordance with claim 2 wherein said rotating screw turns at a rate of between about 300 and about 700 revolutions per minute.

4. A method in accordance with claim 2 wherein said rotating screw forces said molten nonvolatile material from said separating zone under a pressure of between abut 40 and about 70 pounds per square inch.

5. A method in accordance with claim 4 wherein said molten nonvolatile material is driven from said separating zone through an orifice plate engaging said conical chamber in a sealed relationship.

6. A method in accordance with claim 1 wherein the temperature in said evaporating and separating zones is maintained above about 140°F.

7. A method in accordance with claim 1 wherein the temperature in said evaporating and separating zones is maintained above about 220°F 8. A method in accordance with claim 1 wherein the temperature in said evaporating and separating zones is maintained between about 250° and about 600°F.

9. A method in accordance with claim 1 wherein a reduced pressure is maintained in said evaporating zone.

10. A method in accordance with claim 1 wherein a reduced pressure is maintained in said evaporating zone.

11. A method in accordance with claim 10 wherein said reduced pressure is between about 10 and about 500 mm Hg.

12. A method of preparing a powder paint composition comprising:
A. introducing a liquid paint composition comprising a solution of
   1. a copolymer containing crosslinkable functional groups, having a glass transition temperature in the range of 40° to 90°C and a number average molecular weight of between about 1,000 and about 15,000;
   2. inert solvent;
   3. a crosslinking agent for said copolymer into an evaporating zone maintained under reduced pressure and adapted to heat said solution so as to vaporize said inert solvent;
B. heating said solution while confining the same within said evaporating zone to a temperature
   1. above the melting point of said copolymer, but below the point at which degradation or gelling occurs;
   2. above the temperature at which said inert solvent begins to vaporize,
thus inducing turbulent flow of said solution within said evaporating zone and thereby maintaining an intimate homogeneous mixture of the vapors of the volatile components of said solution and the dispersed particles of the molten non-volatile components;
C. passing said homogeneous mixture from said evaporating zone into a separating zone maintained at a reduced pressure and comprising a conical chamber containing a rotating tapered screw wherein:
   1. said solvent vapor is caused to be removed from said chamber; and
   2. said nonvolatile material is mechanically driven down said rotating screw while in a molten state and out of said conical chamber;
D. cooling said nonvolatile components to form a solid material by depositing them on a chilled surface; and
E. pulverizing said solid material to form a homogeneous powder.

13. A method in accordance with claim 12 wherein said rotating screw turns at a rate of between about 300 and about 700 revolutions per minute.

14. A method in accordance with claim 12 wherein said rotating screw forces said molten nonvolatile material from said separating zone under a pressure of between about 40 and about 70 psi.

15. A method in accordance with claim 12 wherein said reduced pressure is between about 10 and about 500 mm Hg.

16. A method in accordance with claim 15 wherein said reduced pressure is between about 20 and about 30 mm Hg.

17. A method in accordance with claim 12 wherein said evaporating zone comprises a plate heat exchanger which defines a tortuous path of relatively narrow cross section elongated in a direction lateral to the flow of said solution through which said solution passes at high velocity while being heated to effect volatilization of said inert solvent and through which said solution continues to pass after volatilization of inert solvent as a mixture of inert solvent and nonvolatile components.

18. A method in accordance with claim 12 wherein the temperature in said evaporating and separating zones is maintained between about 250° and about 600°F.

19. A method of preparing a powder paint composition comprising:
A. introducing a liquid paint composition comprising a solution of
   1. a copolymer formed from glycidyl acrylate or glycidyl methacrylate and an ethylenically unsaturated monomer in such proportions as to obtain a copolymer with a glass transition temperature in the range of 40° to 90° C and a number average molecular weight in the range of 2,500 to 8,500;
   2. crosslinking agent;
   3. pigment; and
   4. inert solvent
into an evaporating zone maintained under reduced pressure and adapted to heat said solution so as to volatilize said inert solvent;

B. heating said solution while confining the same within said evaporating zone to a temperature
   1. above the melting point of said copolymer, but below the point at which degradation or gelling occurs;
   2. above the temperature at which said inert solvent begins to vaporize, thus inducing turbulent flow of said solution within said evaporating zone and thereby maintaining an intimate homogeneous mixture of the vapors of the volatile components of said solution and the dispersed particles of the molten nonvolatile components;

C. passing said homogeneous mixture from said evaporating zone into a separating zone maintained at reduced pressure and comprising a conical chamber containing a rotating tapered screw wherein:
   1. said solvent vapor is caused to be removed from said separating zone;
   2. said nonvolatile material is mechanically driven down said rotating screw and out of said separating zone;

D. cooling said nonvolatile component to form a solid material by depositing on a chilled surface; and E. pulverizing the solid material to form a homogeneous uniformly pigmented powder.

20. A method in accordance with claim 19 wherein said rotating scrw turns at a rate of between about 300 and about 700 revolutions per minute.

21. A method in accordance with claim 19 wherein said rotating screw forces said material from said separating zone under a pressure of between 40 and about 70 psi.

22. A method in accordance with claim 19 wherein said reduced pressure ranges between about 10 and about 500 mm Hg.

23. A method in accordance with claim 19 wherein said evaporating and separating zones are maintained at a temperature of between about 250° and about 600°F.

24. A method in accordance with claim 19 wherein said crosslinking agent is a straight chain aliphatic dicarboxylic acid.

* * * * *